United States Patent
Guo et al.

(10) Patent No.: US 11,210,765 B2
(45) Date of Patent: Dec. 28, 2021

(54) IMAGE PROCESSING METHOD AND DEVICE, STORAGE MEDIUM AND COMPUTER DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jun Guo, Beijing (CN); Xibin Shao, Beijing (CN); Chengqi Zhou, Beijing (CN); Ming Chen, Beijing (CN); Shou Li, Beijing (CN); Jieqiong Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 565 days.

(21) Appl. No.: 16/300,971

(22) PCT Filed: Apr. 24, 2018

(86) PCT No.: PCT/CN2018/084215
§ 371 (c)(1),
(2) Date: Nov. 13, 2018

(87) PCT Pub. No.: WO2019/041842
PCT Pub. Date: Mar. 7, 2019

(65) Prior Publication Data
US 2021/0224954 A1    Jul. 22, 2021

(30) Foreign Application Priority Data
Aug. 28, 2017    (CN) .......................... 201710762836.9

(51) Int. Cl.
*G06T 5/00* (2006.01)
*G06T 5/20* (2006.01)
(Continued)

(52) U.S. Cl.
CPC ................ *G06T 5/001* (2013.01); *G06T 5/20* (2013.01); *G06T 5/40* (2013.01); *G06T 5/50* (2013.01);
(Continued)

(58) Field of Classification Search
CPC .. G06T 5/001; G06T 5/20; G06T 5/40; G06T 5/50; G06T 2207/20021; G06T 2207/20024; G06T 2207/20076
See application file for complete search history.

(56) References Cited

U.S. PATENT DOCUMENTS 6,312,385 B1 * 11/2001 Mo ...................... A61B 5/1075
600/443
7,636,467 B2    12/2009 Burian et al.
2008/0285853 A1 * 11/2008 Bressan .................... G06T 5/40
382/169

FOREIGN PATENT DOCUMENTS

CN    101231747 A    7/2008
CN    101655974 A    2/2010
(Continued)

OTHER PUBLICATIONS

Search Report and Written Opinion for International Application No. PCT/CN2018/084215 dated Jul. 18, 2018.
(Continued)

*Primary Examiner* — Kim Y Vu
*Assistant Examiner* — Francisco A Agra
(74) *Attorney, Agent, or Firm* — Calfee, Halter & Griswold LLP (57) ABSTRACT

An image processing method and device, storage medium and computer device are provided. The method includes:
(Continued)

generating an original gray scale image of an original image; performing a histogram equalization process on the original gray scale image to obtain an equalized gray scale image; generating decision factor distribution image, wherein the decision factor distribution image includes a first marked region including a region where pixels that are adjacent in position and have standard deviations smaller than set value in the original image are located, and second marked region; obtaining final gray scale image according to original gray scale image, equalized gray scale image and decision factor distribution image. Gray scale values of pixel corresponding to second marked region and first marked region in final gray scale image are respectively gray scale values of corresponding pixel in equalized gray scale image and original gray scale image; and restoring a processed image.

20 Claims, 3 Drawing Sheets (51) Int. Cl.
G06T 5/40 (2006.01)
G06T 5/50 (2006.01)
(52) U.S. Cl.
CPC ............... G06T 2207/20021 (2013.01); G06T 2207/20024 (2013.01); G06T 2207/20076 (2013.01)

(56) References Cited

FOREIGN PATENT DOCUMENTS

| | | |
|---|---|---|
| CN | 102129673 A | 7/2011 |
| CN | 102722871 A | 10/2012 |
| CN | 102999750 A | 3/2013 |
| CN | 103325102 A | 9/2013 |
| CN | 103377468 A | 10/2013 |
| CN | 104574316 A | 4/2015 |
| CN | 105139366 A | 12/2015 |
| CN | 105654438 A | 6/2016 |
| CN | 106296600 A | 1/2017 |
| CN | 106504205 A | 3/2017 |
| WO | 2007012986 A1 | 2/2007 |

OTHER PUBLICATIONS

First office action of Chinese application No. 201710762836.9 dated Mar. 25, 2020.
Extended European search report of counterpart EP application No. 18789754.1 dated Jul. 13, 2021.
Buzuloiu V et al., Adaptive-neighborhood histogram equalization of color images; Journal of Electronic Imaging 10(2), Apr. 1, 2001, abstract, pp. 447-459.
Nithyananda C R et al, Review on Histogram Equalization based Image Enhancement Techniques; International Conference on Electrical, Electronics, and Optimization Techniques (ICEEOT)—2016, Mar. 3, 2016, pp. 2512-2517, entire document.
Anonymus, Standard deviation, Wikipedia, May 29, 2020, 21 pages.

* cited by examiner

IMAGE PROCESSING METHOD AND DEVICE, STORAGE MEDIUM AND COMPUTER DEVICE

This application is a National Stage filing of PCT Patent Application Serial No. PCT/CN2018/084215, filed on Apr. 24, 2018, which claims priority to Chinese Patent Application No. 201710762836.9, filed on Aug. 28, 2017 and titled "IMAGE PROCESSING METHOD AND DEVICE", the entire disclosures of which are incorporated herein by reference.

TECHNICAL FIELD

The present disclosure relates to an image processing method and device, a storage medium and a computer device.

BACKGROUND

Histogram equalization is an image processing method, which changes a gray histogram of an original image from a certain gray range that is relatively concentrated to a uniform distribution within an entire gray range. The contrast ratio of an image can be enhanced by histogram equalization on the image, such that the image becomes clearer.

However, for a video image, due to the existence of a pseudo-flat portion, histogram equalization may result in deterioration of the image quality of the pseudo-flat portion in the image, which seriously degrades the image quality. The pseudo-flat portion in the video image is caused by over-compression of the video image during processing and transmission. The pseudo-flat portion refers to a region in a pseudo-flat state in the image. Although the region in the pseudo-flat state seems to have the same gray scale, it is actually composed of similar gray scales. For example, a scenario such as sky in the video image, when compressed, forms a block region with adjacent gray scales. When histogram equalization is performed on such an image in the block pseudo-flat state, the difference between the gray scales of the pseudo-flat portion may be enlarged, which may cause the pseudo-flat portion to have irregular blocks apparent to naked eyes, resulting in a deterioration of the image quality of the pseudo-flat portion in the image, as well as a degradation of the quality of the image.

SUMMARY

There are provided an image processing method and device, a storage medium and a computer device in embodiments of the present disclosure.

There is provided an image processing method in at least one embodiment of the present disclosure, comprising:

generating an original gray scale image of an original image;

performing a histogram equalization process on the original gray scale image to obtain an equalized gray scale image;

generating a decision factor distribution image according to the original gray scale image, wherein the decision factor distribution image comprises a first marked region and a second marked region, the first marked region comprises a region where pixels that are adjacent in position and have standard deviations smaller than a set value in the original image are located, and the second marked region is a region other than the first marked region in the decision factor distribution image;

obtaining a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image; and restoring a processed image according to the final gray scale image.

In an implementation of the embodiments of the present disclosure, the generating a decision factor distribution image according to the original gray scale image comprises:

calculating a standard deviation of each pixel in the original gray scale image to obtain a standard deviation distribution image according to the gray scale values of pixels within a certain region centered on each pixel in the original gray scale image, wherein the standard deviation distribution image comprises the standard deviation of each pixel in the original gray scale image; and dividing a pixel having the standard deviation smaller than the set value in the standard deviation distribution image into the first marked region, and dividing a region other than the first marked region in the standard deviation distribution image into the second marked region to obtain the decision factor distribution image.

In another implementation of the embodiments of the present disclosure, calculating a standard deviation of each pixel in the original gray scale image to obtain a standard deviation distribution image according to the gray scale values of pixels within a certain region centered on each pixel in the original gray scale image comprises:

calculating a squared value of the gray scale value of each pixel in the original gray scale image to form a gray scale square image;

performing mean filtering on the original gray scale image to generate a first expectancy image, and performing mean filtering on the gray scale square image to generate a second expectancy image;

calculating a squared value of the gray scale value of each pixel in the first expectancy image to obtain a third expectancy image;

calculating a difference value between the gray scale values of pixels in corresponding positions of the second expectancy image and the third expectancy image to obtain a difference image; and calculating a square root of the gray scale value of each pixel in the difference image to obtain the standard deviation distribution image.

In another implementation of the embodiments of the present disclosure, the performing mean filtering on the original gray scale image comprises:

performing the mean filtering on the original gray scale image by means of a filtering template having a size of an in in, in being 10 to 20, and the performing mean filtering on the gray scale square image comprises:

performing the mean filtering on the gray scale square image by means of a filtering template having a size of an m*m.

In another implementation of the embodiments of the present disclosure, m is 15.

In another implementation of the embodiments of the present disclosure, after the generating a decision factor distribution image according to the original gray scale image, the image processing method further comprises:

updating the decision factor distribution image to enable that in the updated decision factor distribution image, the second marked region comprises a region where pixels that are adjacent in position and have standard deviations greater than or equal to the set value in the original image, and a region with the number of the pixels therein smaller than a threshold value in the region where the pixels that are adjacent in position and have standard deviations smaller than the set value in the original image.

In another implementation of the embodiments of the present disclosure, the threshold value is 8%-15% of the number of the pixels of the original image.

In another implementation of the embodiments of the present disclosure, the threshold value is 10% of the number of the pixels of the original image.

In another implementation of the embodiments of the present disclosure, the set value ranges from 1 to 5.

There is provided an image processing device in at least one embodiment of the present disclosure, comprising:

a generating circuit configured to generate an original gray scale image of an original image;

a histogram equalization circuit configured to perform a histogram equalization process on the original gray scale image to obtain an equalized gray scale image;

a first processing circuit configured to generate a decision factor distribution image according to the original gray scale image, wherein the decision factor distribution image comprises a first marked region and a second marked region, the first marked region comprises a region where pixels that are adjacent in position and have standard deviations smaller than a set value in the original image, and the second marked region is a region other than the first marked region in the decision factor distribution image;

a second processing circuit configured to obtain a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image; and a third processing circuit configured to restore a processed image according to the final gray scale image.

In an implementation of the embodiments of the present disclosure, the first processing circuit is configured to: calculate a standard deviation of each pixel in the original gray scale image to obtain a standard deviation distribution image according to the gray scale values of pixels within a certain region centered on each pixel in the original gray scale image, wherein the standard deviation distribution image comprises the standard deviation of each pixel in the original gray scale image; and divide a pixel having the standard deviation smaller than the set value in the standard deviation distribution image into the first marked region, and divide a region other than the first marked region in the standard deviation distribution image into the second marked region to obtain the decision factor distribution image.

In another implementation of the embodiments of the present disclosure, the first processing circuit comprises:

a first calculating sub-circuit configured to calculate a squared value of the gray scale value of each pixel in the original gray scale image to form a gray scale square image;

a mean filtering sub-circuit configured to perform mean filtering on the original gray scale image to generate a first expectancy image, and performing mean filtering on the gray scale square image to generate a second expectancy image;

a second calculating sub-circuit configured to calculate a squared value of the gray scale value of each pixel in the first expectancy image to obtain a third expectancy image;

a third calculating sub-circuit configured to calculate a difference value between the gray scale values of pixels in corresponding positions of the second expectancy image and the third expectancy image to obtain a difference image; and a fourth calculating sub-circuit configured to calculate a square root of the gray scale value of each pixel in the difference image to obtain the standard deviation distribution image.

In another implementation of the embodiments of the present disclosure, the mean filtering sub-circuit configured to: perform the mean filtering on the original gray scale image and the gray scale square image respectively by means of a filtering template having a size of an m*m, m being 10 to 20.

In another implementation of the embodiments of the present disclosure, m is 15.

In another implementation of the embodiments of the present disclosure, after the generating the decision factor distribution image according to the original gray scale image, the first processing circuit is further configured to: update the decision factor distribution image to enable that in the updated decision factor distribution image, the second marked region comprises a region where pixels that are adjacent in position and have standard deviations greater than or equal to the set value in the original image, and a region with the number of the pixels therein smaller than a threshold value in the region where the pixels that are adjacent in position and have standard deviations smaller than the set value in the original image.

In another implementation of the embodiments of the present disclosure, the threshold value is 8%-15% of the number of the pixels of the original image.

In another implementation of the embodiments of the present disclosure, the threshold value is 10% of the number of the pixels in the original image.

In another implementation of the embodiments of the present disclosure, the set value ranges from 1 to 5.

There is provided storage medium in at least one embodiment of the present disclosure, comprising at least one instruction stored therein, wherein the at least one instruction is loaded and executed by a processor to implement the operations in the above-mentioned image processing method.

There is provided a computer device in at least one embodiment of the present disclosure, comprising a memory, a processor and a computer program stored in the memory and operating in the processor, wherein the processor is configured execute the computer program to implement the operations in the above-mentioned image processing method.

DETAILED DESCRIPTION

The present disclosure will be described in further detail with reference to the enclosed drawings, to clearly present the principles and advantages of the present disclosure.

Figure 1:
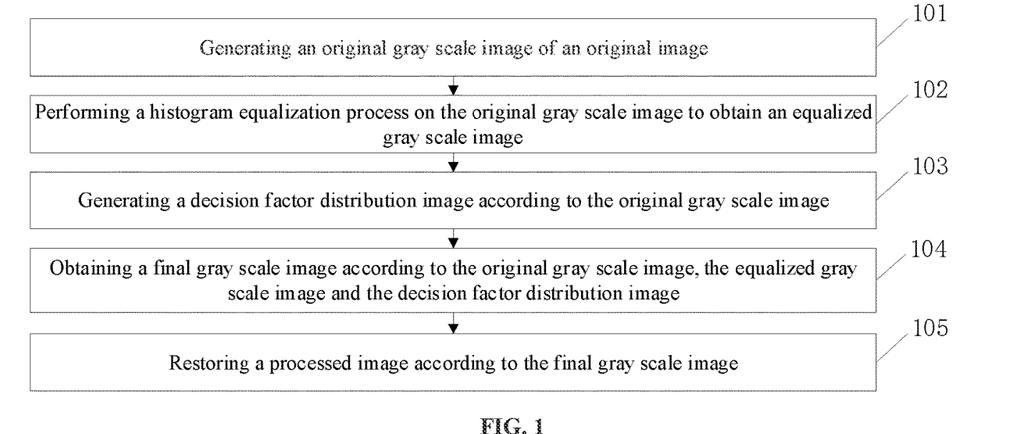
FIG. 1 is a flow chart of an image processing method according to an embodiment of the present disclosure.

FIG. 1 is a flow chart of an image processing method provided by an embodiment of the present disclosure. Referring to FIG. 1, the image processing method comprises the following steps.

In Step 101, an original gray scale image of an original image is generated.

The original image may be an image obtained in various ways, such as an image obtained by photographing or a video image. The original image is a red (R) green (G) blue (B) image.

In the embodiments of the present disclosure, the generating of an original gray scale image of an original image may comprise: acquiring an original image; and processing the original image to obtain an original gray scale image.

Herein, the processing of the original image includes, but not limited to: converting the original image into an image with YUV format or other formats, to generate the original gray scale image. In the YUV format, Y represents luminance, and U and V represent chrominance. Thus, if there is only a Y component but no U and V components, the obtained image is a gray scale image. Based on this, in the step 101, image conversion may be performed to generate the original gray scale image.

In Step 102, a histogram equalization process is performed on the original gray scale image to obtain an equalized gray scale image.

In the embodiments of the present disclosure, the performing of the histogram equalization process on the original gray scale image may be implemented as follows:

(1) The number $n_i$ of pixels of each gray scale in the original gray scale image is counted, i=0, 1, . . . , L−1, and L is the total number of gray scales of the original gray scale image. The total number of gray scales of the original gray scale image is the levels of gray scales that may be presented by the pixels in the original gray scale image. For example, L=256, where i is 0-255.

(2) A histogram of the original image, that is, a probability density $P_i(r_i)$ of each gray scale in the original gray scale image, is calculated:

$$P_i(r_i) = n_i/n \quad (1).$$

In the formula (1), n is the total number of the pixels in the original gray scale image, $r_i$ is the i-th gray scale, and $n_i$ is the number of the pixels of the i-th gray scale. The probability density of each gray scale is calculated by the formula to obtain the histogram of the original image. The horizontal axis in the histogram of the original image represents the gray scale and the vertical axis therein represents the probability density. The histogram of the original image includes the probability density of each gray scale.

(3) A cumulative distribution function $s_k(r_k)$ of the original gray scale image is calculated:

$$s_k(r_k) \approx \sum_{i=0}^{k} P_i(r_i) \quad k = 0, 1, \ldots L-1. \quad (2)$$

In the formula (2), $r_k$ is the k-th gray scale. The value of a cumulative distribution function of the k-th gray scale is the sum of the probability densities of the 0 to k-th gray scales.

(4) The gray scale gk of each pixel in the original gray scale image after equalization, i.e., the gray scale gk of each pixel in the gray scale image, is calculated according to the cumulative distribution function $s_k(r_k)$ of the original gray scale image:

$$gk = \text{INT}[gm * s_k(r_k)] \quad (3).$$

In the formula (3), INT[ ] is a rounding symbol, and gm is equal to L−1.

For the pixel having the gray scale of k in the original gray scale image, its gray scale in the gray scale image after equalization is gk. In this way, the gray scale of each pixel in the original gray scale image after equalization can be calculated.

(5) The gray scale of the original gray scale image is modified according to the gray scale of each pixel of the original gray scale image in the gray scale image after equalization to obtain the equalized gray scale image.

That is, the gray scale of each pixel in the original gray scale image is modified from k to gk, such that the gray scale of each pixel is modified to be the gray scale image after equalization. The obtained gray scale image is the equalized gray scale image.

In Step 103, a decision factor distribution image is generated according to the original gray scale image. The decision factor distribution image comprises a first marked region and a second marked region. The first marked region comprises a region where pixels that are adjacent in position and have standard deviations smaller than a set value in the original image are located. The second marked region is a region other than the first marked region in the decision factor distribution image.

Herein, the standard deviation in the present disclosure refers to a square root of the gray scale value of each pixel in a difference image that is calculated by subtracting an image obtained by performing the filtering and squaring on the original gray scale image, from a gray scale square value image of the original gray scale image after filtering. Herein, the filtering refers to calculating the mean value of the gray scale values within a certain range from the pixel as the gray scale value of the pixel. The standard deviation may reflect the gray scale difference between each pixel in the original gray scale image and the surrounding pixels.

Figure 2:
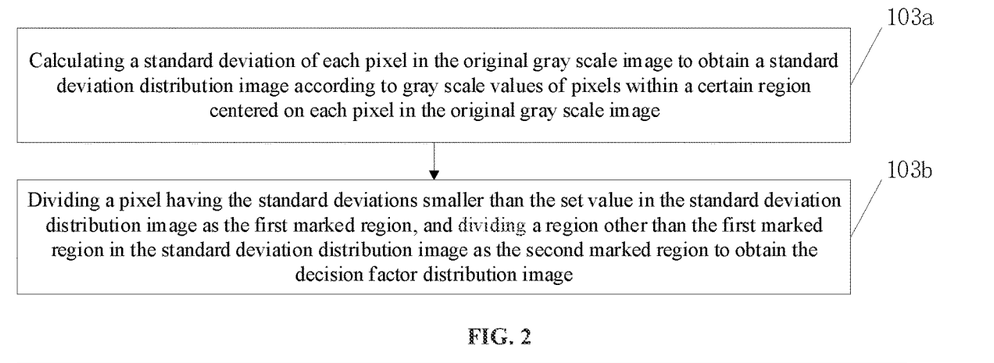
FIG. 2 is a is flow chart of a process of generating a decision factor distribution image according to an embodiment of the present disclosure.

FIG. 2 is a flow chart of the step 103 provided by the embodiments of the present disclosure. Referring to FIG. 2, the step 103 may comprise the following sub-steps.

In sub-step 103a, a standard deviation of each pixel in the original gray scale image is calculated to obtain a standard deviation distribution image according to gray scale values of pixels within a certain region centered on each pixel in the original gray scale image. The standard deviation distribution image comprises the standard deviation of each pixel in the original gray scale image.

Exemplarily, the sub-step 103a may comprise: calculating a squared value of the gray scale value of each pixel in the original gray scale image to form a gray scale square image; performing mean filtering on the original gray scale image and the gray scale square image to generate a first expectancy image and a second expectancy image respectively, that is, performing mean filtering on the original gray scale image to generate the first expectancy image, and performing mean filtering on the gray scale square image to generate the second expectancy image; calculating a squared value of the gray scale value of each pixel in the first expectancy image to obtain a third expectancy image; calculating a difference value between the gray scale values of pixels in corresponding positions of the second expectancy image and the third expectancy image to obtain a difference image; and calculating a square root of the gray scale value of each pixel in the difference image to obtain the standard deviation distribution image.

The standard deviation distribution image obtained by this method may reflect the gray scale difference between each pixel and the surrounding pixels. Thus, during follow-up region division, the pseudo-flat region may be divided as the first marked region.

The performing mean filtering on the original gray scale image and the gray scale square image may comprise: performing the mean filtering on the original gray scale image and the gray scale square image by means of a filtering template having a size of an m*m. The mean filtering refers to that, for a pixel (x, y) to be processed, selecting a filtering template consisting of a plurality of pixels adjacent to the pixel to be processed, calculating an average gray scale value of all the pixels in the filter template, assigning the average gray scale value to the pixel (x, y) to be processed, to serve as the gray scale of the pixel (x, y) of the image subjected to the mean filtering. The filtering template is configured to define the number of the pixels for calculating the average gray scale value. During use of the filtering template, the pixel to be processed is located in the center (such as the true center or adjacent to the pixel in the true center) of pixels selected by the filtering template. M may be 10 to 20.

With the M within this value range, it can be ensured that the standard deviation distribution image may better indicate the pseudo-flat region in the original image, such that the pseudo-flat region is not enhanced, thereby preventing the image quality deterioration.

Exemplarily, m is 15. With m being 15, it is ensured that the pseudo-flat region can be distinguished from the original image to the utmost extent.

Herein, the second expectancy image and the third expectancy image have the same number of rows and same number of columns. The pixels in the corresponding positions mean the pixels in the same rows and columns of the second expectancy image and the third expectancy image.

In sub-step 103b, dividing a pixel having the standard deviations smaller than the set value in the standard deviation distribution image as the first marked region, and dividing a region other than the first marked region in the standard deviation distribution image as the second marked region to obtain the decision factor distribution image.

In the above processes of generating the decision factor distribution image, the standard deviation distribution image of the original gray scale image is calculated first. The first marked region is marked off according to a relationship between the standard deviation of each pixel in the standard deviation distribution image and the set value. Since the pseudo-flat region has a relatively smaller gray scale difference, the standard deviation of the pixel in the pseudo-flat region is also relatively smaller. Thus, a portion with the standard deviation smaller than the set value in the standard deviation distribution image is determined as a pseudo-flat region (i.e., the first marked region). The remaining region is determined as the second marked region.

Further, the first marked region and the second marked region may be divided by using a binaryzation method. Exemplarily, the first marked region and the second marked region are divided by the following steps: setting a pixel value of a pixel, which corresponds to the pixel having the standard deviation smaller than the set value in the standard deviation distribution image, in the decision factor distribution image to be 0, and setting a pixel value, which corresponds to the pixel with the standard deviation greater than or equal to the set value in the standard deviation distribution image, in the decision factor distribution image to be 1. Thus, in the decision factor distribution image, the pixel with the pixel value of 0 belongs to in the first marked region, and the pixel with the pixel value of 1 belongs to in the second marked region.

After the region is divided by using the binaryzation method, it is only needed to determine whether the pixel corresponds to the first marked region or the second marked region according to the pixel value in the decision factor distribution image in the subsequent processing processes, which is simple and convenient.

In the embodiments of the present disclosure, the set value may range from 1 to 5. The set value within this value range is employed to guarantee that the decision factor distribution image may better indicate the pseudo-flat region in the original image, such that the pseudo-flat region is not enhanced, thereby preventing the image quality deterioration.

Exemplarily, the set value is 1. With the set value being 1, it may ensure that the pseudo-flat region can be distinguished from the original image to the utmost extent.

Optionally, after the generating a decision factor distribution image according to the original gray scale image, the image processing method further comprises:

updating the decision factor distribution image to enable that in the updated decision factor distribution image, the second marked region comprises a region where pixels that are adjacent in position and have standard deviations greater than or equal to the set value in the original image are located, and a region with the number of the pixels therein smaller than a threshold value in the region where the pixels that are adjacent in position and have standard deviations smaller than the set value in the original image are located.

A hole filling algorithm is actually used in the above-mentioned updating process of the decision factor distribution image. A region with the number of the pixels therein being smaller than a threshold value in the region where the pixels that are adjacent in position and have standard deviations smaller than the set value in the original image are located, is divided as the second marked region. During processing, a hole and its peripheral pixels are processed in the same way. Thus, it is avoided the case where only the periphery or the center of a certain region (hole) is enhanced, resulting in a sudden change in the contrast ratio between the center of the region and the periphery in the processed image.

In the embodiments of the present disclosure, the threshold value may be 8%-15% of the number of the pixels of the original image. By use of the threshold value within this value range, the hole filling algorithm is performed only when the pixels in the center of the region are less enough.

Thus, the hole filling algorithm may not be performed on the region where the number of pixels is greater than or equal to the threshold value. Accordingly, the image quality of the pseudo-flat region may be optimized.

Exemplarily, the threshold value is 10%. At this time, the hole filling algorithm may not be performed on the region where the number of pixels is greater than or equal to the threshold value, such that the image quality of the pseudo-flat region may be optimized. It is also avoided that only the periphery or the center of a certain region is enhanced, resulting in a sudden change in the contrast ratio between the center of the region and the periphery in the processed image.

In Step 104, obtaining a final gray scale image according to the original gray scale image, the equalized gray scale image and the decision factor distribution image. A gray scale value of a pixel corresponding to the second marked region in the final gray scale image is a gray scale value of a pixel corresponding to the second marked region in the equalized gray scale image. A gray scale value of a pixel corresponding to the first marked region in the final gray scale image is a gray scale value of a pixel corresponding to the first marked region in the original gray scale image.

In the step 104, the final gray scale image may be calculated according to the following formula:

$$I(i,j)=G(i,j)*H(i,j)\pm(1-G(i,j))*A(i,j) \qquad (4).$$

In the formula (4), I represents the final gray scale image. G represents the decision factor distribution image (0 represents the pixel in the first marked region and 1 represents the pixel in the second marked region). H represents the equalized gray scale image. A represents the original gray scale image. Herein, I(i,j) represents the pixel of the i-th row and j-th column in the equalized gray scale image. A(i,j) represents the pixel of the i-th row and j-th column in the original gray scale image. Through calculation according to the above-mentioned formula, the gray scale value of the pixel corresponding to the second marked region in I is the gray scale value of the pixel corresponding to the second marked region in H. The gray scale value of the pixel corresponding to the first marked region in I is the gray scale value of the pixel corresponding to the first marked region in A.

In Step 105, a processed image is restored according to the final gray scale image.

In this step, the final gray scale image is restored into an R (red) G (green) B (blue) image to obtain a processed original image. That is, a YUV image is restored into the RGB image.

In the embodiments of the present disclosure, the original gray scale image and the equalized gray scale image are generated according to the original image. Then, the decision factor distribution image is generated according to the original gray scale image. In the decision factor distribution image, the first marked region comprises the region where pixels that are adjacent in position and have standard deviations smaller than a set value in the original image are located. Since the gray scale difference value of the pseudo-flat portion is small, the standard deviation of the pixels of the pseudo-flat portion is also small. Thus, the region, corresponding to the first marked region, in the original image is the pseudo-flat portion. The pseudo-flat portion is not enhanced, that is, the histogram equalization process is not performed thereon, thus, the pseudo-flat portion is still represented by the gray scale values of the pixels in the original gray scale image. The second marked region is represented by the gray scale value of the pixel in the gray scale image processed by the histogram equalization process. That is, the second marked region is represented by the gray scale values of the pixels in the equalized gray scale image. Since the pseudo-flat portion is not enhanced by the above method, the difference between the gray scales of the pseudo-flat portion is not enlarged, thereby preventing the image quality of the pseudo-flat portion in the image from being deteriorated, and ensuing the image quality of the image.

Figure 3:
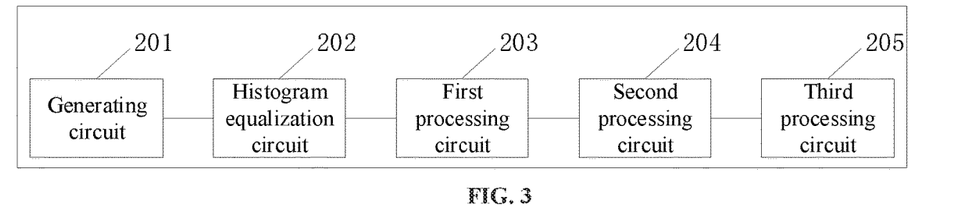
FIG. 3 is a schematic image of a structure of an image processing device according to an embodiment of the present disclosure.

FIG. 3 is a schematic diagram of a structure of an image processing device according to an embodiment of the present disclosure. Referring to FIG. 3, the image processing device includes: a generating circuit 201, a histogram equalization circuit 202, a first processing circuit 203, a second processing circuit 204 and a third processing circuit 205.

Herein, the generating circuit 201 is configured to generate an original gray scale image of an original image. The histogram equalization circuit 202 is configured to perform a histogram equalization process on the original gray scale image to obtain an equalized gray scale image. The first processing circuit 203 is configured to generate a decision factor distribution image according to the original gray scale image, wherein the decision factor distribution image comprises a first marked region and a second marked region. The first marked region comprises a region where pixels that are adjacent in position and have standard deviations smaller than a set value in the original image are located, and the second marked region is a region other than the first marked region in the decision factor distribution image. The second processing circuit 204 is configured to obtain a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image. The third processing circuit 205 is configured to restore a processed image according to the final gray scale image.

Herein, each of the generating circuit 201, the histogram equalization circuit 202, the first processing circuit 203, the second processing circuit 204 and the third processing circuit 205 may be implemented by using an independent circuit. Herein, the circuit may be a chip or an integrated circuit, such as a central processing unit (CPU) and a graphics processing unit (GPU). Any two or more of the generating circuit 201, the histogram equalization circuit 202, the first processing circuit 203, the second processing circuit 204 and the third processing circuit 205 may also be implemented by using the same circuit. For example, the generating circuit 201, the histogram equalization circuit 202, the first processing circuit 203, the second processing circuit 204 and the third processing circuit 205 are implemented by using the same GPU.

In the embodiments of the present disclosure, the original gray scale image and the equalized gray scale image are generated according to the original image. Then, the decision factor distribution image is generated according to the original gray scale image. In the decision factor distribution image, the first marked region comprises the region where pixels that are adjacent in position and have standard deviations smaller than a set value in the original image are located. Since the gray scale difference value of the pseudo-flat portion is small, the standard deviation of the pixels of the pseudo-flat portion is also small. Thus, the region, corresponding to the first marked region, in the original image is the pseudo-flat portion. The pseudo-flat portion is not enhanced, that is, the histogram equalization process is not performed thereon, thus, the pseudo-flat portion is still represented by the gray scale values of the pixels in the original gray scale image. The second marked region is represented by the gray scale value of the pixel in the gray scale image processed by the histogram equalization process. That is, the second marked region is represented by the gray scale values of the pixels in the equalized gray scale image. Since the pseudo-flat portion is not enhanced by the above method, the difference between the gray scales of the pseudo-flat portion is not enlarged, thereby preventing the image quality of the pseudo-flat portion in the image from being deteriorated, and ensuing the image quality of the image.

In the embodiments of the present disclosure, the first processing circuit 203 is configured to calculate a standard deviation of each pixel in the original gray scale image to obtain a standard deviation distribution image according to the gray scale values of pixels within a certain region centered on each pixel in the original gray scale image. The standard deviation distribution image comprises the standard deviation of each pixel in the original gray scale image. The first processing circuit 203 is also configured to divide a pixel having the standard deviation smaller than the set value in the standard deviation distribution image into the first marked region, and to divide a region other than the first marked region in the standard deviation distribution image as the second marked region to obtain the decision factor distribution image.

In the above processes of generating the decision factor distribution image, the first processing circuit 203 first calculates the standard deviation distribution image of the original gray scale image, and marks off the first marked region according to the relationship between the standard deviation of each pixel in the standard deviation distribution image and the set value. Since the pseudo-flat region has a relatively smaller gray scale difference, the standard deviation of the pixel in the pseudo-flat region is also relatively smaller. Thus, a portion having the standard deviation smaller than the set value in the standard deviation distribution image is determined as a pseudo-flat region (i.e., the first marked region).

Further, the first processing circuit 203 may divide the first marked region and the second marked region by using a binaryzation method which includes the following steps: setting a pixel value of a pixel, which corresponds to the pixel having the standard deviation smaller than the set value in the standard deviation distribution image, in the decision factor distribution image to be 0, and setting a pixel value, which corresponds to the pixel with the standard deviation greater than or equal to the set value in the standard deviation distribution image, in the decision factor distribution image to be 1. Thus, in the decision factor distribution image, the pixel with the pixel value of 0 belongs to the first marked region, and the pixel with the pixel value of 1 belongs to the second marked region.

After the region is divided by using the binaryzation method, it is only needed to determine whether the pixel corresponds to the first marked region or the second marked region according to the pixel value in the decision factor distribution image in the subsequent processing processes, which is simple and convenient.

Figure 4:
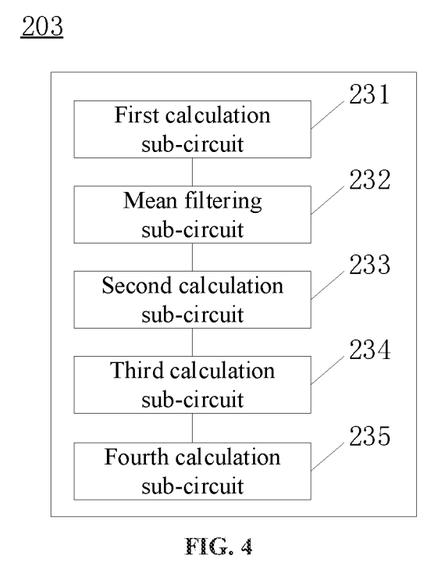
FIG. 4 is a schematic image of a structure of a first processing circuit according to an embodiment of the present disclosure.

FIG. 4 is a schematic diagram of a structure of the first processing circuit 203 provided by an embodiment of the present disclosure. Referring to FIG. 4, the first processing circuit 203 comprises a first calculation sub-circuit 231, a mean filtering sub-circuit 232, a second calculation sub-circuit 233, a third calculation sub-circuit 234 and a fourth calculation sub-circuit 235.

Herein, the first calculation sub-circuit 231 is configured to calculate a squared value of the gray scale value of each pixel of the original gray scale image to form a gray scale square image. The mean filtering sub-circuit 232 is configured to perform mean filtering on the original gray scale image to generate a first expectancy image, and to perform mean filtering on the gray scale square image to generate a second expectancy image. The second calculation sub-circuit 233 is configured to calculate a squared value of the gray scale value of each pixel in the first expectancy image to obtain a third expectancy image. The third calculation sub-circuit 234 is configured to calculate a difference value between the gray scale values of pixels in corresponding positions of the second expectancy image and the third expectancy image to obtain a difference image. The fourth calculation sub-circuit 235 is configured to calculate a square root of the gray scale value of each pixel in the difference image to obtain the standard deviation distribution image. The standard deviation distribution image obtained by using this method may reflect the gray scale difference between each pixel and the surrounding pixels. Thus, during the follow-up region division, the pseudo-flat region can be divided as the first marked region.

In the embodiments of the present disclosure, the mean filtering sub-circuit 232 is configured to perform the mean filtering on the original gray scale image by means of a filtering template having a size of an m*m. M is 10 to 20.

With the M within this value range, it can be ensured that the standard deviation distribution image may better indicate the pseudo-flat region in the original image, such that the pseudo-flat region is not enhanced, thereby preventing the image quality deterioration.

Exemplarily, m is 15. With m being 15, it is ensured that the pseudo-flat region can be distinguished from the original image to the utmost extent.

In the embodiments of the present disclosure, after generating the decision factor distribution image according to the original gray scale image, the first processing circuit 203 is further configured to update the decision factor distribution image to enable that in the updated decision factor distribution image, the second marked region comprises a region where pixels that are adjacent in position and have standard deviations greater than or equal to the set value in the original image are located, and a region with the number of the pixels therein smaller than a threshold value in the region where the pixels that are adjacent in position and have standard deviations smaller than the set value in the original image are located.

A hole filling algorithm is actually used in the above-mentioned updating process of the decision factor distribution image. A region with the number of the pixels therein being smaller than a threshold value in the region where the pixels that are adjacent in position and have standard deviations smaller than the set value in the original image are located, is divided as the second marked region. During processing, a hole and its peripheral pixels are processed in the same way. Thus, it is avoided the case where only the periphery or the center of a certain region (hole) is enhanced, resulting in a sudden change in the contrast ratio between the center of the region and the periphery in the processed image.

In the embodiments of the present disclosure, the threshold value may be 8%-15% of the number of the pixels of the original image. By use of the threshold value within this value range, the hole filling algorithm is performed only when the pixels in the center of the region are less enough. Thus, the hole filling algorithm may not be performed on the region where the number of pixels is greater than or equal to the threshold value. Accordingly, the image quality of the pseudo-flat region may be optimized.

Exemplarily, the threshold value is 10%. At this time, the hole filling algorithm may not be performed on the region where the number of pixels is greater than or equal to the threshold value, such that the image quality of the pseudo-flat region may be optimized. It is also avoided that only the periphery or the center of a certain region is enhanced, resulting in a sudden change in the contrast ratio between the center of the region and the periphery in the processed image.

In the embodiments of the present disclosure, the set value may be 1 to 5. The set value within this value range is employed to guarantee that the decision factor distribution image may better indicate the pseudo-flat region in the original image, such that the pseudo-flat region is not enhanced, thereby preventing the image quality deterioration.

Exemplarily, the set value is 1. With the set value being 1, it may ensure that the pseudo-flat region can be distinguished from the original image to the utmost extent.

In the embodiments of the present disclosure, the second processing circuit 204 may be configured to calculate the final gray scale image according to the following formula: $I(i,j)=G(i,j)*H(i,j)+(1-G(i,j))*A(i,j)$.

Herein, I represents the final gray scale image. G represents the decision factor distribution image (0 represents the pixel in the first marked region and 1 represents the pixel in the second marked region). Herein, H represents the equalized gray scale image. A represents the original gray scale image. $I(i,j)$ represents the pixel of the i-th row and j-th column in the equalized gray scale image. $A(i,j)$ represents the pixel of the i-th row and j-th column in the original gray scale image. Through calculation according to the above-mentioned formula, the gray scale value of the pixel corresponding to the second marked region in I is the gray scale value of the pixel corresponding to the second marked region in H. The gray scale value of the pixel corresponding to the first marked region in I is the gray scale value of the pixel corresponding to the first marked region in A.

It should be noted that when the image processing device provided by the embodiments performs image processing, division of the above-mentioned functional modules is only taken as examples for explanation. In practice, the above-mentioned functional allocation may be accomplished by the different functional modules as required. That is, internal structure of the device is divided into the different functional modules to accomplish all or part of the functions described above. In addition, the image processing method and the image processing device provided by the embodiments belong to the same concept. The specific implementation process of the image processing device can be referred to the method embodiment, which is not repeated herein.

Figure 5:
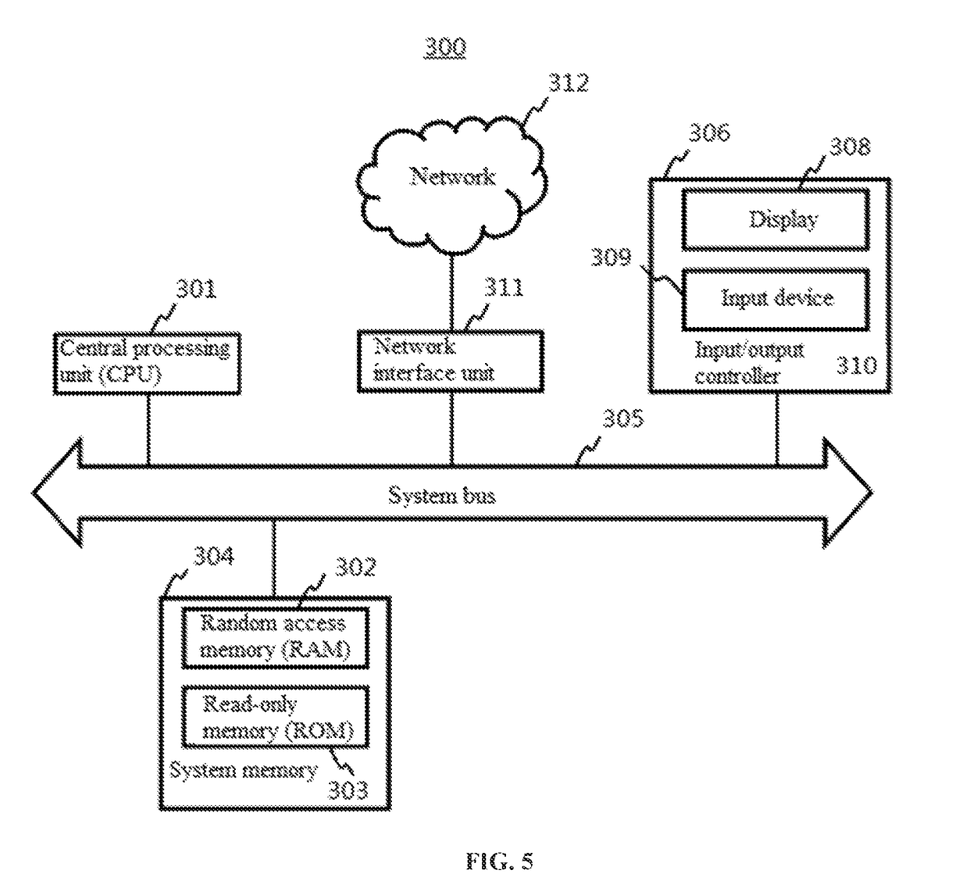
FIG. 5 is a schematic image of a structure of an image processing device according to an embodiment of the present disclosure.

FIG. 5 is a schematic diagram of a structure of an image processing device provided by an embodiment of the present disclosure. The image processing device may be a device such as a computer.

A computer 300 comprises a central processing unit (CPU) 301, a system memory 304 comprising a random access memory (RAM) 302 and a read-only memory (ROM) 303, and a system bus 305 connecting the system memory 304 and the central processing unit 301. The computer 300 further comprises a basic input/output system (I/O system) 306 that facilitates the transfer of information between various devices in the computer.

The basic input/output system 306 comprises a display 308 for displaying information and input devices 309 such as a mouse and a keyboard for inputting information by a user. The display 308 and the input device 309 are connected to the CPU 301 through an input/output controller 310 that is connected to the system bus 305. The basic input/output system 306 further comprises the input/output controller 310 for receiving and processing inputs from a plurality of other devices, such as the keyboard, the mouse or an electronic touch pen. Similarly, the input/output device 310 further provides outputs for a display screen, a printer or output devices in other types.

Without loss of generality, a computer readable medium may comprise a computer storage medium and a communication medium. The computer storage medium comprises a volatile medium, a non-volatile medium, a removable medium and a non-removable medium, that can be implemented in any method or technology for storing information such as a computer readable instruction, a data structure, a program module or other data. The computer memory medium comprises an RAM, an ROM, an EPROM, an EEPROM, a flash memory or other solid-state storage technology, a CD-ROM, a DVD or other optical storages, a tape cartridge, a magnetic tape, a disk memory or other magnetic memory devices. Certainly, those skilled in the art may understand that the computer storage medium is not limited to the above.

According to the various embodiments of the present disclosure, the computer 300 may be further operated by a remote computer connected to a network through such networks as Internet. That is, the computer 300 may be connected to a network 312 through a network interface unit 311 that is connected to the system bus 305, or may be connected to the networks or a remote computer system (not shown) in other types by the network interface unit 311.

The abovementioned memory further comprises one or more programs stored in the memory and configured to be executed by the CPU. When the CPU executes the program in the memory, the method shown in any one of FIG. 1 and FIG. 2 can be realized.

In an exemplary embodiment, there is further provided a computer readable memory medium including instructions, such as, a memory including instructions. The instructions can be loaded and executed by the central processing unit 301 of the computer 300 to accomplish the method shown in any one of FIG. 1 and FIG. 2. For example, the computer readable memory medium may be an ROM, a random access memory (RAM), a CD-ROM, a magnetic tape, a floppy disk, an optical data memory device or the like.

Those skilled in the art may understand that all or part of steps in the embodiment may be accomplished by hardware or in the way that the program instructs related hardware. The program may be stored in the computer readable medium. The above-mentioned memory medium may be a read-only memory, a magnetic disk, a compact disc or the like.

The foregoing descriptions are only exemplary embodiments of the present disclosure, and are not intended to limit the present disclosure. Within the spirit and principles of the disclosure, any modifications, equivalent substitutions, improvements, etc., are within the protection scope of the appended claims of the present disclosure.

What is claimed is:

1. An image processing method, comprising:
generating an original gray scale image of an original image;
performing a histogram equalization process on the original gray scale image to obtain an equalized gray scale image;
generating a decision factor distribution image according to the original gray scale image, wherein the decision factor distribution image comprises a first marked region and a second marked region, the first marked region comprises a region where pixels that are adjacent in position and have standard deviations smaller than a set value in the original image are located, and the second marked region is a region other than the first marked region in the decision factor distribution image;
obtaining a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image; and
restoring a processed image according to the final gray scale image.

2. The image processing method according to claim 1, wherein the generating a decision factor distribution image according to the original gray scale image comprises:
calculating a standard deviation of each pixel in the original gray scale image to obtain a standard deviation distribution image according to the gray scale values of pixels within a certain region centered on each pixel in the original gray scale image, wherein the standard deviation distribution image comprises the standard deviation of each pixel in the original gray scale image; and
dividing a pixel having the standard deviation smaller than the set value in the standard deviation distribution image into the first marked region, and dividing a region other than the first marked region in the standard deviation distribution image as the second marked region to obtain the decision factor distribution image.

3. The image processing method according to claim 2, wherein the calculating a standard deviation of each pixel in the original gray scale image to obtain a standard deviation distribution image according to the gray scale values of pixels within a certain region centered on each pixel in the original gray scale image comprises:
calculating a squared value of the gray scale value of each pixel in the original gray scale image to form a gray scale square image;
performing mean filtering on the original gray scale image to generate a first expectancy image, and performing mean filtering on the gray scale square image to generate a second expectancy image;
calculating a squared value of the gray scale value of each pixel in the first expectancy image to obtain a third expectancy image;
calculating a difference value between the gray scale values of pixels in corresponding positions of the second expectancy image and the third expectancy image to obtain a difference image; and
calculating a square root of the gray scale value of each pixel in the difference image to obtain the standard deviation distribution image.

4. The image processing method according to claim 3, wherein the performing mean filtering on the original gray scale image comprises:
performing the mean filtering on the original gray scale image by means of a filtering template having a size of an m*m, m being 10 to 20, and the performing mean filtering on the gray scale square image comprises:
performing the mean filtering on the gray scale square image by means of a filtering template having a size of an m*m.

5. The image processing method according to claim 4, wherein m is 15.

6. The image processing method according to claim 2, wherein after the generating a decision factor distribution image according to the original gray scale image, the image processing method further comprises:
updating the decision factor distribution image to enable that in the updated decision factor distribution image, the second marked region comprises a region where pixels that are adjacent in position and have standard deviations greater than or equal to the set value in the original image are located, and a region with the number of the pixels therein smaller than a threshold value in the region where the pixels that are adjacent in position and have standard deviations smaller than the set value in the original image are located.

7. The image processing method according to claim 6, wherein the threshold value is 8%-15% of the number of the pixels of the original image.

8. The image processing method according to claim 7, wherein the threshold value is 10% of the number of the pixels of the original image.

9. The image processing method according to claim 1 herein the set value ranges from 1 to 5.

10. An image processing device, comprising:
a generating circuit configured to generate an original gray scale image of an original image;
a histogram equalization circuit configured to perform a histogram equalization process on the original gray scale image to obtain an equalized gray scale image;
a first processing circuit configured to generate a decision factor distribution image according to the original gray scale image, wherein the decision factor distribution image comprises a first marked region and a second marked region, the first marked region comprises a region where pixels that are adjacent in position and have standard deviations smaller than a set value in the original image are located, and the second marked region is a region other than the first marked region in the decision factor distribution image;
a second processing circuit configured to obtain a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image; and
a third processing circuit configured to restore a processed image according to the final gray scale image.

11. The image processing device according to claim 10, wherein the first processing circuit is configured to: calculate a standard deviation of each pixel in the original gray scale image to obtain a standard deviation distribution image according to the gray scale values of pixels within a certain region centered on each pixel in the original gray scale image, wherein the standard deviation distribution image comprises the standard deviation of each pixel in the original gray scale image; and divide a pixel having the standard deviation smaller than the set value in the standard deviation distribution image into the first marked region, and divide a region oilier than the first marked region in the standard deviation distribution image into the second marked region to obtain the decision factor distribution image.

12. The image processing device according to claim 11, wherein the first processing circuit comprises:

a first calculating sub-circuit configured to calculate a squared value of the gray scale value of each pixel in the original gray scale image to form a gray scale square image;

a mean filtering sub-circuit configured to perform mean filtering on the original gray scale image to generate a first expectancy image, and performing mean filtering on the gray scale square image to generate a second expectancy image;

a. second calculating sub-circuit configured to calculate a. squared value of the gray scale value of each pixel in the first expectancy image to obtain a third expectancy image;

a third calculating sub-circuit configured to calculate a difference value between the gray scale values of pixels in corresponding positions of the second expectancy image and the third expectancy image to obtain a difference image; and a fourth calculating sub-circuit configured to calculate a square root of the gray scale value of each pixel in the difference image to obtain the standard deviation distribution image.

13. The image processing device according to claim 12, wherein the mean filtering sub-circuit configured to: perform the mean filtering on the original gray scale image and the gray scale square image respectively by means of a filtering template having a size of an m*m, m being 10 to 20.

14. The image processing device according to claim 13, wherein m is 15.

15. The image processing device according to claim 11, wherein after the generating the decision factor distribution image according to the original gray scale image, the first processing circuit is further configured to: update the decision factor distribution image to enable that in the updated decision factor distribution image, the second marked region comprises a region where pixels that are adjacent in position and have standard deviations greater than or equal to the set value in the original image are located, and a region with the number of the pixels therein smaller than a threshold value in the region where the pixels that are adjacent in position and have standard deviations smaller than the set value in the original image are located.

16. The image processing device according to claim 15, wherein the threshold. value is 8%-15% of the number of the pixels of the original image.

17. The image processing device according to claim 16, wherein the threshold value is 10% of the number of the pixels in the original image.

18. The image processing device according to claim 10, wherein the set value ranges from 1 to 5.

19. A storage medium, comprising at least one instruction stored therein, wherein the at least one instruction is loaded and executed by a processor to implement operations in the image processing method according to claim 1.

20. A computer device, comprising a memory, a processor and a computer program stored in the memory and operating in the processor, wherein the processor is configured execute the computer program to implement operations in the image processing method comprising:

generating an original gray scale image of an original image;

performing a histogram equalization process on the original gray scale image to obtain an equalized gray scale image;

generating a decision factor distribution image according to the original gray scale image, wherein the decision factor distribution image comprises a first marked region and a second marked region, the first marked region comprises a region where pixels that are adjacent in position and have standard deviations smaller than a set value in the original image are located, and the second marked region is a region other than the first marked region in the decision factor distribution image;

obtaining a final gray scale image according to the original gray scale image, the equalized gray scale image and the decision factor distribution image, wherein a gray scale value of a pixel corresponding to the second marked region in the final gray scale image is a gray scale value of a pixel corresponding to the second marked region in the equalized gray scale image, and a gray scale value of a pixel corresponding to the first marked region in the final gray scale image is a gray scale value of a pixel corresponding to the first marked region in the original gray scale image; and restoring a processed image according to the final gray scale image.

* * * * *